STEM FABRICATING PROCESS

Filed Sept. 11, 1958

INVENTORS
ANTHONY J. CERTA
JOHN F. Mc MAHON, JR.

BY Carl H. Synnestvedt
AGENT

United States Patent Office 3,069,876

Patented Dec. 25, 1962

3,069,876

STEM FABRICATING PROCESS

Anthony J. Certa, Norristown, and John F. McMahon, Jr., Lansdale, Pa., assignors, by mesne assignments, to Philco Corporation, Philadelphia, Pa., a corporation of Delaware Filed Sept. 11, 1958, Ser. No. 760,454
6 Claims. (Cl. 65—43)

This invention relates generally to the art of making glass-to-metal seals and more particularly to a unique method of fabricating glass-to-copper seals.

While of broader applicability, the invention has particular utility in the manufacture of semi-conductor devices of the type requiring hermetic encapsulation and it is in this particular field of application that the method steps of the invention are described. It is general knowledge that there is an affinity between the oxides of certain metals and glass and that, in particular instances, to insure good adherence between the glass and metal, it is necessary that an oxide film be formed on a surface of the metal to act as a bonding bridge between the glass and metal substrate, the oxide, during sealing, undergoing partial dissolution in the molten glass, an occurrence referred to as "wetting."

The presently accepted technique for obtaining the desired surface oxidation of copper is to heat the copper to a relatively high temperature in a controlled atmosphere and then to cool the copper at a critical rate. The oxidizing temperature required by this process is sufficiently high that material existing in metastable condition goes into thermodynamic equilibrium resulting in recrystallization of the metal and consequent reduction in its strength properties. While the strength properties may be restored by cold working, there are numerous applications which make resort to this procedure highly impractical, if not impossible.

Additionally, when using the above described process particular care must be taken when sealing to a thin piece of copper in order to avoid perforation of the copper substrate by oxide growth during sealing, a condition conventionally avoided by the somewhat complex procedure known as "borating."

Accordingly it is a general object of this invention to provide a unique, simplified method of producing glass-to-copper seals which obviates the limitations of prior art devices.

It is a more particular object of this invention to provide a method of producing glass-to-copper seals which eliminates the necessity for subjecting the copper body to high temperature oxidation prior to making the seal thereby avoiding a pre-seal weakening of the parent copper.

A still further object of this invention is to provide a non-critical process for producing hermetic glass-to-copper seals.

The invention is not concerned with the detailed constituency of the particular sealing material employed; the term "glass" is consequently to be given a board connotation, contemplating glasses, frits, ceramics, and materials of similar nature.

Briefly stated this invention relates to a unique method of producing glass-to-copper seals, which comprises oxidizing surface portions of a body of cold-worked copper to the cupric state under conditions of time and temperature preventing copper recrystallization, and by chemical treatment by any of a number of commercially available formulations. The sheath of cupric oxide thus formed provides a continuous protective film preventing post-manufacturing surface contamination. Accordingly the work piece may undergo normal handling after oxidation without fear of contamination or deformation. Following this novel, relatively low temperature oxidation, the glass-to-copper seal may be made by simply bringing the glassing media into intimate contact with the oxidized surface of the copper and heating the assembly to a temperature sufficient to effect hermetic juncture. One particularly advantageous glassing procedure, which this invention makes it possible to apply to copper is the glass-compacting technique described and claimed in copending application entitled "Method of and Apparatus for Sealing," bearing Serial No. 654,907 filed April 24, 1957, and assigned to the assignee of the present invention, now abandoned.

During "glassing" the black cupric oxide undergoes conversion to red cuprous oxide, the latter composition being a readily wettable, strongly adherent compound having a coefficient of thermal expansion more nearly compatible with that of the normal sealing "glasses" and affording the required bonding bridge between the copper and "glass" matrix.

The initial low temperature oxidation facilitates the attainment of a homogeneous, readily reproducible surface coating permitting precise duplication on a mass production basis, and importantly avoids weakening of the copper through high temperature oxidation prior to seal formation.

As indicated previously a particular advantageous use of this process is in the preparation of closures for use in the hermetic encapsulation of semi-conductor devices, particularly closure made by the glass-compacting technique referred to above. This technique briefly stated, consists of compacting fusible insulating material in granular form, such as powdered glass, within a suitable mold defining member, as for example a metallic eyelet, the resulting mechanical integration of particles serving to produce sufficiently intimate contact between the core material and contacting surface portions of the eyelet to effect, on subsequent heating, hermetic juncture of the core and eyelet. This powdered glass technique enables the production of a self supporting assembly capable of being freely handled prior to the sealing phase without dislodgement of the core or parts positioned therein, a technique greatly facilitating the fabrication of stem closures.

Now making detailed reference to the drawing.

Figure 1:
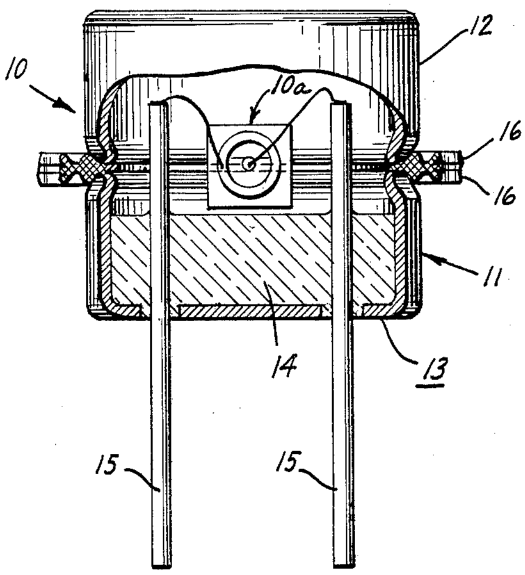
FIGURE 1 is a view, on a greatly enlarged scale, depicting an encapsulated transistor assembly embodying seals made in accordance with the present invention.

FIGURE 1 shows a transistor assembly 10 comprising an eyelet type stem assembly 11 and an overlying cap, hat or encasing member 12. The stem eyelet 13 houses a core 14 of insulating material, such as glass, traversed by a plurality of leads 15 providing electrical accessibility to the encased semiconductor assembly **10*a***.

In the fabrication of semiconductor devices of the type shown, it has generally been found necessary to hermetically encapsulate the semiconductor **10*a*, the encapsulation being most desirably accomplished by joining the confronting flanges 16 of the can 11 and eyelet 13** in cold welded juncture. It is preferred to make the eyelet and can of copper, copper possessing many of the properties of an ideal metal from both an electrical and mechanical standpoint, this metal having a low yield strength, high ductility and high thermal and electrical conductivity.

It has heretofore been impractical, to employ the powdered-glass technique in assemblies utilizing copper retaining structures since the required high temperature oxidation of the copper, preparatory to making a seal, resulted in softening or weakening of the copper member to such an extent that the structure could not withstand the distorting forces existent during the glass-compacting phase of the process.

Molds designed to reenforce the copper structure to help resist these distoring forces were found ineffective in that those portions of the copper structure which are not perfectly mated to the confining surfaces of the mold undergo localized distortion during compacting of the glass resulting in jamming of the work piece in the mold. Resort to the method steps of this invention has overcome these difficulties and made available to the glass-to-copper sealing art those advantages inhering in the glass compacting process indicated above and discussed in the above mentioned copending application.

While the invention is advantageously highlighted by the described application it should be understood that the concepts of the invention are applicable in other fields, where the making of glass-to-copper seals are of importance.

The various method steps in the fabrication of the stem assembly 11 are described in detail below.

Figure 2:
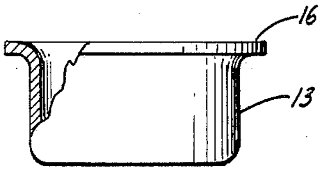
FIGURE 2 is a fragmentary showing, on a somewhat smaller scale, of a transistor stem eyelet, of the type shown in FIGURE 1 before undergoing treatment in accordance with the method steps of this invention.

The stem eyelet 13 shown in FIGURE 2, is drawn from 10 mil stock and has an overall height of .115", a cylinder O.D. of .303" and a flange O.D. of .37", and is preferably made of oxygen-free high-conductivity copper, this type of copper being used to satisfy requirements of high Q and to facilitate hermetic juncture of the stem assembly 13 and can 11 by cold welding techniques. The absence of occluded oxygen in this type copper is particularly important in the type of construction illustrated, since extremely high pressures are required to effect the desired cold welding juncture of the confronting peripheral flanges 16 of the can or hat 12 and eyelet 13. The pressure induced heat results in vaporization of any occluded gas resulting in disruption of the interfacial bond destroying the hermetic seal. Moreover, the release of these metal vapors can seriously contaminate the semiconductor and associated elements rendering the semiconductor device unusable.

It should be understood, however, that the process is equally applicable to alloys of high copper content and to structure comprising a suitable core sheathed with copper, such as the wire known in the trade as "dumet" having a nickel-steel core encased in a skin of copper.

For most effective treatment the eyelet is thoroughly surface cleaned by any of a number of commercially available techniques, as for example by immersing the eyelet in 50% nitric acid for a few seconds followed by a thorough rinsing in running tap water. Concentrated acid is preferable to dilute because it produces a bright clean etch more readily. Another equally effective technique is to first degrease the part in a 20 percent solution of potassium hydroxide followed by a slight etch in a solution of 20 percent ammonium chloride to remove any latent oxide film from the member. Any of numerous commercially recognized techniques, of which the above are exemplary, may be employed to obtain a body of copper substantially free of surface contaminants. This step, while not indispensible to the method teachings of the invention, is highly desirable if consistently satisfactory results are to be obtained.

After cleaning, the eyelet 13 is oxidized at a temperature below that inducing recrystallization of the copper structure by any of a number of commercially available techniques to produce a uniform surface coating of black cupric oxide. One such technique is to prepare from a mixture of dry salt comprising 54 percent sodium hydroxide and 46 percent sodium chlorite, a solution having a 2.4 normality of NaOH. This solution is then heated to approximately 210°–215° F. and the copper eyelet 13 immersed therein for 20 minutes, this time-temperature relation being one set of exemplary operating conditions effecting the desired oxidation without copper recrystallization. The solution is then decanted and the eyelet thoroughly rinsed in hot running tap water after which the eyelet is rinsed in methyl alcohol and oven dried. The concentration of salts and pH of the solution can be varied over a considerable range, so long as the solution remains basic, the general rule being the lower the concentration the longer the exposure required to produce the desired surface oxidation. Oxidation, however, even when employing a low concentration of salts such as 20 grams per liter of NaOH and 10 grams per liter of MaOCl can be materially accelerated by increasing the temperature of the solution within ranges below that resulting in recrystallization of the copper work piece. Higher temperatures and concentrations are normally required for oxidizing copper alloys.

Experimentation has disclosed that any oxidizing agent in an alkaline solution capable of releasing bromine chlorine, iodine, and/or nascent oxygen will oxidize copper to produce the black cupric oxide. The solution however will not oxidize copper if it contains any copper complexing agent, as for example, ammonium, ethylenediamine tetraacetic acid, or cyanide.

Figure 3:
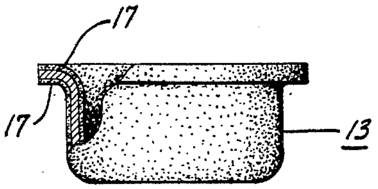
FIGURE 3 is a view showing the eyelet of FIGURE 2 after low temperature oxidation, the oxide layer being shown on an exaggerated scale for purposes of illustration.

Still another effective formulation for oxidizing copper to the cupric state is to prepare 100 cc. of a five normal solution of potassium hydroxide to which is added ten cc. of sodium hypochlorite containing 5 to 6% free chlorine. FIGURE 3 graphically depicts the eyelet 13 after having been oxidized in accordance with the procedure outlined above, the oxide coating 17 being shown on an exaggerated scale for purposes of illustration. This oxide, as previously mentioned, protects the copper surface from contamination. Moreover, the structural strength of eyelet 13 is not impaired by this initial low temperature oxidation and consequently the eyelet 13 may be handled in normal fashion without fear of damage, this characteristic being particularly significant when producing seals in the manner described below.

Figure 4:
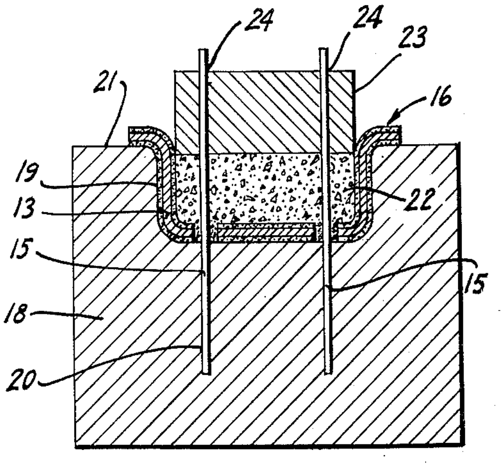
FIGURE 4 is a view showing a preferred mode of transistor stem fabrication to which the method teachings of this invention have particular application.

In FIGURE 4, there is shown a mold 18 containing an eyelet receiving cavity 19, the bottom surface of which is provided with suitable positioning apertures 20 for receiving the leads 15. The cavity 19 is of a depth permitting the eyelet 13, on insertion thereof in said cavity to rest on the cavity floor the lower surface of the eyelet flange 16 barely making contact with the upper surface 21 of the die 18.

With the eyelet and leads in position within the mold 18 the eyelet cavity is charged with a powdered glass mixture 22 having a normal sealing temperature in the range of 800–850° C., the glass being ground so as to produce a substantially homogeneous mixture of −60–80 mesh particles.

The powdered glass is then compacted by means of a suitably apertured cylindrical piston 23 which through hydraulic or other suitable means is brought into bearing relation with the powdered glass as shown in FIGURE 4, the apertures 24 within the piston 23 being oriented to register with the lead guides in the mold 18 in order to maintain lead orientation during compression of the powdered glass. It has been found that a force of about 3000 lbs. exerted on the mixture through the intermediation of the piston 23, which piston is adapted to slide within the eyelet 13, produces adequate mechanical integration of the particles to retain the leads in requisite orientation during subsequent phases of fabrication and produces sufficiently intimate contact between the leads, core, and eyelet that an acceptable hermetic seal may be made on subsequent firing without the necessity of further processing. Moreover, this pressure-induced mechanical integration of particles serves to lock the fusible core material within the eyelet in such manner that the assembly comprising eyelet and compacted core when moved from the retaining mold presents a self sustaining, integrated structure. The cold pressed stems are then processed and heated in an electric oven, or by other suitable means, to sealing temperature, a representative temperature for example when using a potash, soda lead glass being in the approximate range of 800–850° C.

The firing temperature, however, is not critical and may have a considerable range of variation depending on the composition of the powdered glass employed.

In summary, applicant provides a glass-to-copper sealing process which permits oxide formation at temperatures below that resulting in weakening of the copper structure and prior to seal formation, the oxide subsequently undergoing conversion during sealing to provide the necessary bonding bridge between the copper and sealing media. In contrast, prior art practice necessitates oxide formation at elevated temperatures and at a time substantially coincident with seal formation, an inflexible procedure which is both destructive of the strength properties of the copper and incompatible with present day mass production techniques.

Figure 5:
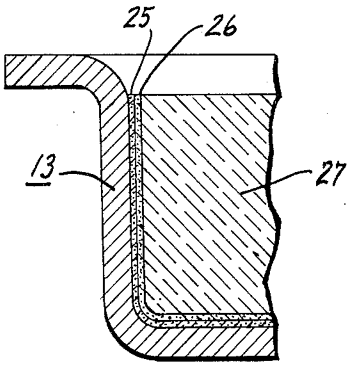
FIGURE 5 is a fragmentary, very much enlarged showing of the completed transistor stem assembly depicting the hermetic juncture of the eyelet and glass matrix.

Heating of the header or stem assembly 11 to sealing temperature converts the black cupric oxide to the red cuprous oxide 25 the conversion presumably taking place as a result of migratory interaction of the copper substrate and the overlying oxide film, the reaction being occasioned by increased atomic activity induced by high ambient temperatures. The copper through a process of induced autoreduction produces a uniform, glass-soluble coating of red cuprous oxide which undergoes partial dissolution, as shown in FIGURE 5 at 26 in the molten glass matrix 27 to form an hermetic seal between the vitrified core 27 and eyelet 13, the converted oxide inner layer 25 forming the necessary bonding bridge. The seal may be made in normal ambient air, but to optimize control over oxide growth and its rate of dissolution in the glassing media it is preferred to carry out the reaction in a controlled atmosphere. Sealing in an inert atmosphere of nitrogen has proven particularly successful, this technique insuring precise control over the thickness of the oxide inner layer insofar as the only oxide subject to conversion is that accurately and controllably produced in the initial low temperature oxidation of the workpiece. Conditions intermediate the above two have also been found successful, namely that of utilizing a nitrogen enriched atmosphere to decelerate oxide growth thereby to provide a more readily controllable process.

This new method of producing glass-to-copper seals permits utilization of the above described, highly advantageous mode of stem fabrication and results in the production of seals having reliability and uniformity.

While the invention has been described with particular reference to specific practice and embodiments, it will be understood by those skilled in the art that the invention is susceptible to changes and modifications without departing from the scope thereof, as defined in the appended claims.

We claim:

1. The method of producing a glass-to-copper seal which comprises: chemically oxidizing surface portions of a body of copper to the cupric state; heating said body in an inert atmosphere to a temperature sufficient to effect reduction of said cupric oxide coating to the cuprous state through thermally-induced interaction of the copper substratum with said cupric oxide coating; and heremetically sealing a quantity of vitric material to said body of copper through the intermediation of the newly formed cuprous oxide coating.

2. In the manufacture of stems for hermetically sealed semiconductor devices, of the type including a cold-worked copper enclosure housing an insulative core of vitric material, the method which consists of: treating surface portions of said enclosure with a composition consisting essentially of an alkaline solution containing an oxidizing agent capable of releasing a gas selected from the group consisting of bromine, chlorine iodine and nascent oxygen to produce on said surface portions a cupric oxide coating of desired thickness; maintaining the temperature-time relationship of said treatment phase at a value preventing recrystallization of said cold-worked copper enclosure; compacting a granulated charge of vitric material within said enclosure and into contact with said surface portions; and heating said enclosure and compacted charge to a temperature sufficient to effect reduction of said cupric oxide coating to the cuprous state through thermally-induced interaction of the copper substratum with said cupric oxide coating, and hermetic juncture between said vitric material and said copper enclosure through the intermediation of the newly formed cuprous oxide coating.

3. In the manufacture of glass-to-copper seals, the method which consists of: treating surface portions of a copper body with a chemical reagent consisting essentially of an oxidizing agent capable of releasing a gas selected from the group consisting of bromine, chlorine, iodine and nascent oxygen, in an alkaline medium, to produce on said surface portions a cupric oxide coating of desired thickness; placing a charge of vitric material in contact with said cupric oxide coating; and heating said copper body to a temperature sufficient to effect reduction of said cupric oxide coating to the cuprous state by thermally-induced interaction of the copper substratum with said cupric oxide coating, and hermetically joining said vitric material to said copper body through the intermediation of the newly formed cuprous oxide coating.

4. In the manufacture of stems for hermetically sealed semiconductor devices, of the type including a copper enclosure housing an insulative core of vitric material, the method which consists of: chemically oxidizing surface portions of said enclosure to the cupric state; placing a charge of vitric material within said enclosure and in contact with said cupric oxide coating; and heating said enclosure and charge of vitric material to a temperature sufficient to effect reduction of said cupric oxide coating to the cuprous state by thermally-induced interaction of the copper substratum with said cupric oxide coating, and hermetic juncture between said vitric material and copper enclosure through the intermediation of the newly formed cuprous oxide coating.

5. In the manufacture of hermetic stems for use in the encapsulation of semiconductor devices of the type including a copper enclosure housing an insulative core of vitric material, the method which consists of: treating surface portions of said enclosure with a chemical reagent consisting essentially of an oxidizing agent in an alkali solution to produce on said surface portions a cupric oxide coating of desired thickness; placing a charge of vitric material within said enclosure and in contact with said cupric oxide coating; and heating the composite structure comprised of said enclosure and charge in a nitrogen-enriched atmosphere to a temperature sufficient to effect reduction of said cupric oxide coating to the cuprous state through thermally-induced migratory interaction of the copper substratum with said cupric oxide coating, and hermetic juncture between said enclosure and vitric material through the intermediation of the cuprous oxide coating.

6. In the manufacture of stems for hermetically sealed semiconductor devices of the type including a copper enclosure housing an insulative core of vitric material, the method which consists of: treating surface portions of said enclosure with a composition consisting essentially of an alkali solution containing an oxidizing agent capable of releasing a gas selected from the group consisting of bromine, chlorine, iodine and nascent oxygen to produce on said surface portions a cupric oxide coating of desired thickness; heating said enclosure to a temperature sufficient to effect reduction of said cupric oxide coating to the cuprous state through thermally-induced interaction of the copper substratum with said cupric oxide coating; placing a charge of vitric material within said enclosure and in contact with said cuprous oxide coating; and hermetically joining said vitric material to said copper enclosure through the intermediation of said cuprous oxide coating.

References Cited in the file of this patent

UNITED STATES PATENTS

| | | |
|---|---|---|
| 1,350,907 | Yanai | Aug. 24, 1920 |
| 1,692,998 | Ruben | Nov. 27, 1928 |
| 1,980,840 | Wright et al. | Nov. 13, 1934 |
| 2,347,421 | Little | Apr. 25, 1944 |
| 2,794,059 | Smith | May 28, 1957 |
| 2,806,971 | Twells et al. | Sept. 17, 1957 |
| 2,898,395 | Schurecht | Aug. 4, 1959 |
| 2,906,907 | Peras | Sept. 29, 1959 |
| 2,933,855 | La Rue | Apr. 26, 1960 |

OTHER REFERENCES

Mellor, "A Comprehensive Treatise on Inorganic and Theoretical Chemistry," Longmans, Green and Co., New York, 1923, volume II, pages 118 to 120.

Mellor, "A Comprehensive Treatise on Inorganic and Theoretical Chemistry," Longmans, Green and Co., New York, 1923, volume III (including Cu and suboxides) pages 118 to 128.